(12) United States Patent
Sobieski

(10) Patent No.: US 6,849,682 B2
(45) Date of Patent: Feb. 1, 2005

(54) VOC CONTAINMENT COATING, METHODS AND ARTICLES

(75) Inventor: Robert T. Sobieski, Charlotte, NC (US)

(73) Assignee: OMNOVA Solutions Inc., Fairlawn, OH (US)

(*) Notice: Subject to any disclaimer, the term of this patent is extended or adjusted under 35 U.S.C. 154(b) by 153 days.

(21) Appl. No.: 10/262,544

(22) Filed: Sep. 30, 2002

(65) Prior Publication Data

US 2004/0071976 A1 Apr. 15, 2004

(51) Int. Cl.[7] .................................................. C08K 5/00
(52) U.S. Cl. ..................... 524/502; 524/507; 524/555; 524/556; 524/560; 524/565; 524/567; 524/568; 524/589
(58) Field of Search ................................. 524/502, 507, 524/555, 556, 560, 565, 567, 568, 589

(56) References Cited

U.S. PATENT DOCUMENTS

| | | | |
|---|---|---|---|
| 4,012,255 A | 3/1977 | McMullen ..................... 96/1.5 |
| 4,071,645 A | 1/1978 | Kahn | |
| 4,130,677 A | 12/1978 | Huntsberger | |
| 4,136,076 A | 1/1979 | Daniels ..................... 260/29.6 |
| 4,284,729 A | 8/1981 | Cross et al. ................. 521/115 |
| 4,339,370 A | 7/1982 | Parker ......................... 524/424 |
| 4,398,955 A | 8/1983 | Stansfield et al. ............. 106/23 |
| 4,491,612 A | 1/1985 | Fischer | |
| 4,597,998 A | 7/1986 | Mostafa ....................... 427/387 |
| 4,603,074 A | 7/1986 | Pate et al. ................... 428/172 |
| 4,732,570 A | 3/1988 | Baumgartner et al. ...... 506/403 |
| 4,925,885 A | 5/1990 | Rosthauser et al. ......... 523/415 |
| 4,981,730 A | 1/1991 | Zaleski .................... 427/393.5 |
| 5,098,477 A | 3/1992 | Vieira et al. .................. 106/22 |
| 5,162,427 A | 11/1992 | Craun et al. ................. 524/560 |
| 5,176,745 A | 1/1993 | Moore et al. .................. 106/22 |
| 5,215,783 A | 6/1993 | Harper ........................ 427/160 |
| 5,227,201 A | 7/1993 | Harper ........................ 427/407 |
| 5,243,011 A | 9/1993 | Panandiker et al. .......... 528/45 |
| 5,310,887 A | 5/1994 | Moore et al. ................. 534/729 |
| 5,331,050 A | 7/1994 | Harper ........................ 525/125 |
| 5,399,611 A | 3/1995 | Mathai ........................ 524/500 |
| 5,464,555 A | 11/1995 | Bayless ........................ 252/153 |
| 5,554,671 A | 9/1996 | Craun et al. ................. 523/408 |
| 5,574,090 A | 11/1996 | Gray et al. .................. 524/560 |
| 5,576,360 A | 11/1996 | Craun et al. ................. 523/407 |
| 5,576,361 A | 11/1996 | Craun ......................... 523/423 |
| 5,594,061 A | 1/1997 | Sharma et al. ............... 524/503 |
| 5,609,710 A | 3/1997 | Charbonneau ............... 427/202 |
| 5,610,263 A | 3/1997 | Jones et al. .................. 528/272 |
| 5,635,279 A | 6/1997 | Ma et al. | |
| 5,641,854 A | 6/1997 | Jones et al. .................. 528/128 |
| 5,667,580 A | 9/1997 | Bäbler ......................... 106/499 |
| 5,693,703 A | 12/1997 | Hart ............................. 524/502 |
| 5,712,363 A | 1/1998 | Noomen et al. ............. 528/229 |
| 5,714,526 A | 2/1998 | Whyzmuzis .................. 523/161 |
| 5,721,309 A | 2/1998 | Sharma et al. ............... 524/506 |
| 5,783,303 A | 7/1998 | Tsuei .......................... 428/354 |
| 5,817,722 A | 10/1998 | Yezrielev et al. ............. 525/441 |
| 5,837,045 A | 11/1998 | Johnson et al. ............ 106/31.85 |
| 5,849,133 A | 12/1998 | Senderling et al. .......... 156/315 |
| 5,866,258 A | 2/1999 | Lucas .......................... 428/424 |
| 5,910,563 A | 6/1999 | Jones et al. .................. 528/272 |
| 5,962,571 A | 10/1999 | Overbeek et al. ............ 524/460 |
| 5,976,706 A | 11/1999 | Yezrielev et al. ............ 428/482 |
| 6,008,273 A | 12/1999 | Leibelt et al. ............... 523/409 |
| 6,037,014 A | 3/2000 | Edgington ................... 427/544 |
| 6,077,929 A | 6/2000 | Pardoen et al. .............. 528/220 |
| 6,083,315 A | 7/2000 | Nakamura et al. ........... 106/410 |
| 6,113,680 A | 9/2000 | Aoyama et al. .......... 106/31.86 |
| 6,114,439 A | 9/2000 | Hwu et al. ................... 524/845 |
| 6,117,225 A | 9/2000 | Nicolls ..................... 106/31.65 |
| 6,133,366 A | 10/2000 | Thetford et al. ............. 524/505 |

(List continued on next page.)

FOREIGN PATENT DOCUMENTS

| | | |
|---|---|---|
| CN | 1332211 A | 1/2002 |
| EP | 0 324 370 | 7/1989 |
| EP | 0 035 353 | 6/1992 |
| EP | 0 546 857 | 6/1993 |
| EP | 0 553 714 | 8/1993 |
| EP | 0 671 448 | 9/1995 |
| EP | 0 684 294 | 11/1995 |
| EP | 0 882 750 | 12/1998 |
| EP | 0 928 307 | 5/2001 |
| EP | 1 008 689 | 8/2001 |
| EP | 0 751 969 | 4/2002 |
| EP | 0 946 647 | 7/2002 |
| JP | 2-294372 | 12/1990 |
| JP | 3-41170 | 2/1991 |
| JP | 3-83559 | 4/1991 |
| JP | 9-302295 | 11/1997 |
| JP | 10-101982 | 4/1998 |
| JP | 10-298464 | 11/1998 |
| WO | WO 88/02766 | 4/1988 |
| WO | WO 94/15974 | 7/1994 |
| WO | WO 94/17145 | 8/1994 |
| WO | WO 97/13795 | 4/1997 |
| WO | WO 97/29143 | 8/1997 |
| WO | WO 99/63016 | 12/1999 |
| WO | WO 01/04172 | 1/2001 |
| WO | WO 02/31021 | 4/2002 |

OTHER PUBLICATIONS

"Low–VOC Coatings Using Reactive Diluents Demonstration Project", Environmental Protection Agency, Robert C. McCrillis et al.

(List continued on next page.)

*Primary Examiner*—D. S. Nakarani
*Assistant Examiner*—Kevin R. Kruer
(74) *Attorney, Agent, or Firm*—Kagan Binder, PLLC; David G. Burleson

(57) ABSTRACT

VOC components are retained within a substrate by coating the substrate with a composition to form an ionically crosslinked polymer matrix in a coating. Methods, compositions, coatings and articles that are coated are described.

30 Claims, No Drawings

U.S. PATENT DOCUMENTS

| | | | |
|---|---|---|---|
| 6,153,680 A | 11/2000 | Shah et al. | 524/425 |
| 6,191,087 B1 | 2/2001 | Opre et al. | 510/201 |
| 6,207,754 B1 | 3/2001 | Yu | 525/133 |
| 6,214,450 B1 | 4/2001 | Wickert et al. | |
| 6,277,512 B1 | 8/2001 | Hamrock et al. | 429/33 |
| 6,359,076 B1 | 3/2002 | Lunsford et al. | 525/330.3 |
| 6,361,826 B2 | 3/2002 | Olson et al. | 427/189 |
| 6,376,570 B1 | 4/2002 | Zhao et al. | 522/42 |
| 6,387,519 B1 | 5/2002 | Anderson et al. | 428/447 |
| 6,428,898 B1 | 8/2002 | Barsotti et al. | 428/447 |
| 6,432,484 B1 | 8/2002 | Corcoran et al. | 427/385.5 |
| 2001/0010254 A1 | 8/2001 | Landau et al. | 156/324 |
| 2001/0031818 A1 | 10/2001 | Feder et al. | 524/442 |
| 2002/0061940 A1 | 5/2002 | Lach et al. | 523/160 |

OTHER PUBLICATIONS

"Soy Provides Boost to Corn–Based Cleaner", Copyright 1999 United Soybean Board.

"Green Solvents for Magnetic Tape Coating", Chemical Engineering Seminar Series, Spring 2000, Feb. 3, Meihua Piao, University of Alabama Department of Chemical Engineering, Copyright 2000.

"Plastisols vs. Water–based Ink for Textile Printing", Fact Sheet, Printing Environmental Technology (PNEAC), by Mike Ukena.

"Biochemicals for the Printing Industry", Dr. David Morris, The Institute for Local Self–Reliance (ILSR), Copyright 1997.

"Rhoplex 1691 Emulsion", Rohm and Haas Company, Jul. 2000.

"Rhoplex I–545 Emulsion", Rohm and Haas Company, Jul. 2000.

"A New Resin System for Super High Solids Coating", H. Tanabe, H. Ohsugi, Progress in Organic Coatings 32, 1997.

"The Presidential Green Chemistry Challenge Awards Program, Summary of 1998 Award Entries and Recipients", United States Environmental Protection Agency, EPA.

"Waterbased Crosslinkable Surface Coatings", R.J. Esser et al., Progress in Organic Coatings 36, 1999.

VOC CONTAINMENT COATING, METHODS AND ARTICLES

FIELD OF THE INVENTION

The present invention relates to coating compositions. More specifically, the present invention relates to coating compositions that may be applied to a substrate comprising VOCs for reduced rate of emission of VOCs from the substrate.

BACKGROUND OF THE INVENTION

People spend a significant amount of time indoors, which has caused more concern about the quality of the air we breathe while inside buildings. Products and materials in homes and office buildings emit pollutants and chemicals, many of which may raise health concerns. Recent studies by the U.S. Environmental Protection Agency and other health agencies have shown that indoor air pollutants are typically two to five times (sometimes 10 to 100 times) higher than levels found in outside air. One class of pollutants that has come under particular scrutiny is volatile organic compounds (VOCs). These compounds are ubiquitous, and much attention has been given to identifying the source of VOCs and reducing their emissions.

Generally, VOCs that are particularly targeted for emission reduction are volatile compounds that contain the element carbon, excluding methane, carbon monoxide, carbon dioxide, carbonic acid, metallic carbides and carbonates, ammonium carbonate, and exempt compounds, such as methylene chloride and 1,1,1-trichlorethane. VOCs are emitted from a surprising number of articles used in everyday life, particularly from virtually all resin-based man-made materials. Thus, wallcovering materials, floorcoverings, ceiling tiles and so forth made from PVC all emit VOCs into the indoor environment. One known source of VOCs is products manufactured of polyvinyl chloride (PVC). Likewise, furniture made from particle board materials, which is wood based materials fixed in a resin binder system, also emit undesirable VOCs, particularly formaldehyde. Additional products utilize organic solvent components to obtain desired processing properties. For example, printing inks are applied using adhesion promoters and other adjuvants that are sources of VOCs in materials that are printed, such as wallpaper, furniture laminates, and the like.

Varnishes and coatings have been used previously to provide a protective finish over surfaces such as vinyl wallcoverings, floor products, furniture and printed articles. Examples of such products are described in U.S. Pat. No. 4,603,074. These overcoats provide protection against stains and damage, but are not designed to and do not reduce emission of VOCs to the environment.

SUMMARY OF THE INVENTION

The present invention provides a VOC containment system wherein a substrate is provided with a coating that surprisingly reduces the emission of VOCs from an article comprising VOCs. For purposes of the present invention, a coating is considered to retain VOCs if a substrate having a coating as described herein at a coating weight of at least about 2.4 g/sq. yard emits no more than about 90% of the VOC emissions level of a like substrate without said coating. This coating preferably maintains a continuous layer even upon exposure to stresses normally associated with the particular substrate.

The present coating is applied from an aqueous system, and therefore does not itself introduce large amounts of VOCs into the environment. Advantageously, the coating as described herein may be applied to any surface of an article in need of VOC containment. The coating is preferably user-friendly in that application techniques need not be sophisticated to achieve an effective coating to provide containment of VOCs.

In certain embodiments of the present invention, most or all of the crosslinks of the polymer are thermally reversible crosslinks because they are ionic in nature. These embodiments provide particular benefit in that the resulting products may be more readily recycled. In these embodiments, the coatings further may be readily removed from the article when desired, simply by exposing the coating to alkali conditions that tend to disrupt the ionic bond of the coating.

In an alternative embodiment of the present invention, the polymers of the coating comprise a substantial degree of crosslinking from covalent bonds, as well as from ionic bonds. These substantially covalently crosslinked embodiments are stable to exposure to alkali solutions.

In a specific embodiment of the present invention, a method is provided for retaining VOC components within a substrate.

In a preferred method, an aqueous coating composition comprising a polymer having an acid number of at least about 3, and an ionomeric crosslinking counterion capable of ionically crosslinking the polymer is applied to a VOC comprising substrate at a dry coating weight of at least about 2.4 g/sq yard. The coating composition is allowed to cure, thereby forming a continuous coating layer that is capable of retaining the VOCs.

In another aspect of the present invention, a method is provided for forming a coating for containment of VOCs in a substrate comprising VOCs. In this method, a substrate material is first identified that contains VOCs. A determination is then made as to which VOCs are present in the substrate in an amount to generate undesirable emissions. Using this information, a coating is formulated that, when coated on the substrate at a coating weight of at least about 2.4 g/sq. yard emits no more than about 90% of the VOC emissions level of a like substrate without said coating.

Coating compositions and articles that are coated by these compositions are also provided.

DETAILED DESCRIPTION

Surprisingly, it has been found that coatings of the present invention effectively retain VOCs under the coating, thereby avoiding release of undesired chemical components to the environment. While not being bound by theory, it is believed that the crosslinks provided predominantly by ionic bonds in the coating form a flexible matrix that effectively retains VOCs. It is believed that ionic bonds tend to act in this environment in the manner of magnetic attractive forces. Thus, these bonds appear to relax or stretch enough to allow the underlying substrate to shift and stretch as required under stress, maintaining adequate barrier performance without destroying the coating.

It has further been surprisingly discovered that the use of a coating having a covalent bond crosslink matrix results in coatings that are too brittle and/or do not form a proper matrix that is effective to retain VOCs. Thus, it has been found that cross-linked polymer matrices wherein the crosslinks are formed primarily of covalent bonds develop microcracks in the coating upon application of a stress to the coating. Such micro-cracks allow the emissions to flow freely from the substrate, resulting in undesirable VOC emissions levels from the VOC in making substrate film.

As noted above, a coating is considered to retain VOCs if a substrate having a coating as described herein at a coating weight of at least about 2.4 g/sq. yard emits no more than about 90% of the VOC emissions level of a like substrate without said coating. This amount of VOC emission reduction is significant in view of the very small amounts of chemicals that are actually emitted by these substrates. Thus, the reduction in the VOC emissions as contemplated herein may reduce the amount of total VOC in the environment of concern to below a threshold level that causes concern or harm in that environment. Additionally, a substrate may be formulated to provide a specifically low VOC content, but which will still not meet local or national VOC emission standards due to product variation in manufacturing or the like. The coatings of the present invention provide a margin of error in the manufacture of products that are close to the maximum threshold allowed VOC emissions, so that a commercially viable product may be made that will consistently meet these VOC emission standards.

More preferably, greater reductions in VOC emissions are observed using coatings of the present invention. Thus, preferably substrates having coatings as described herein, when applied at a coating weight of at least about 2.4 g/sq. yard, emit no more than about 85%, and more preferably no more than about 80% of the VOC emissions level of a like substrate without said coating. Is further contemplated that even higher levels of VOC retention may be achieved by providing coating weights that are higher. Thus, preferably compositions the present invention are provided coating weights of between about 2.4 g./sq. yard to about 20 g./sq. yard, without sacrificing flexibility of the coating so that it may be applied to a flexible substrate. In the case of substrates that are not flexible, coating weights greater than about 20 g./sq. yard are contemplated because the coatings do not need to be flexible. Higher coating weights will achieve even greater VOC retention. Thus, for rigid substrates such as particleboard substrates, a coating weight of, for example, between about 20 g./sq. yard and about 40 g./sq. yard may be desirable.

The coating composition of the present invention comprises a polymer having functionality capable of forming a crosslinking ionomeric bond. Preferably, the polymer comprises acid functionality or acid functionality precursors that can form an ionic bond with a cationic crosslinking agent. For purposes of the present invention, an acid functionality precursor is any functional group on the polymer that may be converted, for example by hydrolysis or the like, to an acid functionality that is capable of forming an ionic bond with a cationic crosslinking agent.

Surprisingly it has been found that aqueous coating compositions comprising polymers having acid or acid precursor groups, wherein the polymer has an acid number of at least about 3 is capable of forming a sufficiently extensive matrix to retain VOCs under the coating. For purposes of the present invention, "acid number" is defined as the weight in milliequivalents of KOH required to neutralize the acid groups in a gram of polymer.

Polymers useful in the present invention are preferably selected such that they will form a coating that is sufficiently incompatible with the VOC to be retained as to pass a VOC Incompatibility Test, and additionally comprise acid or acid precursor functionality to have an acid number of at least about 3.

A coating is determined to be incompatible with a particular VOC by routine evaluation using the VOC Incompatibility Test, described as follows.

A coating is formed on a substrate by application of a coating composition to the substrate at a dry coating weight of about 2.4 g./sq. yard. For clear coatings, an additional coloring agent such as iron oxide may be added to facilitate evaluation of the coating composition. The coating is allowed to cure with ionic crosslinking under ordinary conditions appropriate for application of the coating to the desired substrate. A 3 ml drop of VOC target component is applied to the coating, and a watchglass is placed over the top of the VOC target component drop and allowed to stand at room temperature (about 25 C.) for about 4 hours. The watchglass is then removed, and the coating is visually inspected for blistering. The coating is deemed to pass the VOC Incompatibility Test if there is no blistering or defect in the coating in the coating as determined by visual inspection by the unaided eye. The evaluation of the coating is preformed as described in ASTM D 1308.

Most preferably, the coating of the present invention passes the VOC Incompatibility Test with the compound or the combination of VOC target compounds that are particularly identified as problematic for that particular substrate and/or the particular environment of use of the ultimate article. For example, in the case of vinyl films, containment of phenol and N-methyl-2-pyrrolidone is of primary importance to provide films having much lower VOC emission as compared to films without the coating of the present invention. Likewise, for certain furniture articles made from pressboard materials, containment of formaldehyde is of primary importance. A coating that passes the VOC Incompatibility Test for formaldehyde is therefore preferred for this embodiment, regardless of its performance relative to other VOCs such as phenol.

It has been found that coatings that are incompatible with phenol are generally effective in retaining many if not most of the other offending VOCs, so that a coating that has passed a VOC Incompatibility Test wherein the VOC target component is phenol generally has use beyond merely retaining phenol. Thus, preferably the coating passes a VOC Incompatibility Test for phenol. Additionally, the coating polymer preferably passes the VOC Incompatibility Test wherein the VOC target compound is one or more of N-methyl-2-pyrrolidone, ethylene glycol, formaldehyde, 2-butoxy ethanol, dodecanol, nonadecanol, hexane, dodecene, methylene heptane, trimethyl cyclohexane, undecane, 1-methyl-2-(3-methylpentyl)cyclopropane, and 2-ethyl hexanoic acid. Preferably the continuous coating layer is incompatible with a mono-component solution made from of at least one member of the group consisting of phenol, formaldehyde, dodecane, hexane and N-methyl-2-pyrrolidone.

As a particularly preferred embodiment, the coating of the present invention is provided as an "all purpose" coating that is effective in retaining a wide variety of VOC compounds. In this embodiment, the coating passes the VOC Incompatibility Test for a specific selection of VOC target compounds, which is phenol, formaldehyde, dodecane, hexane and N-methyl-2-pyrrolidone. In this evaluation, the VOC Incompatibility Tests are preferably performed individually on each of the VOC target compounds as monosolutions. Coating compositions that pass the VOC Incompatibility Test for all five of the above compounds are particularly preferred for use in the present invention.

In a preferred embodiment, the polymer used in the aqueous coating composition is polymerized using emulsion polymerization. This type of polymerization is preferred because it automatically incorporates functionality useful for generating the ionomeric crosslinks required in the present coating composition. Thus, in emulsion polymerizations, the initiator used in the polymerization must be water soluble, and will ordinarily introduce acid functionality to at least the end groups of the polymers that are being formed. Particularly preferred polymers comprise carboxylic acid functionality or sulfonic acid functionality. In addition, other acids can also be incorporated into the polymer back bone, such as functionality derived from acrylic acid or methacrylic acid.

In one aspect of the present invention, the polymer may have a relatively low initial Tg, which provides particular benefit in forming a continuous coating on the substrate. Thus, due to the conformability of the initial coating that is formed with these relatively soft polymers, a coating may be obtained with little or no addition of coalescing agents, which are themselves VOCs, to assist in formation of a continuous film. This is particularly the case where the chemical nature of the polymer of the coating is similar to the chemistry of the substrate to be coated. Thus, a polymer comprising vinyl chloride functionality is likely to exhibit affinity to a PVC substrate, and provide a better and more adherent coating to that substrate. In the low Tg embodiment, the Tg of the polymer is selected to be about 0–70° C. As the coating is formed on the surface of the substrate, the ionic interactions occur, thereby creating the ionic crosslink matrix. This crosslink matrix raises the effective Tg of the polymer coating composition to a much higher temperature, thereby hardening the coating to a degree not achievable by a like polymer without the ionic crosslinking component. Surprisingly, such polymer coatings, which are typically brittle in nature, have sufficient flexibility to be applied to a flexible vinyl film without fracturing during ordinary flexing operations of the film. While not being bound by theory, is believed that the ionomeric crosslinking provide sufficient internal cohesion within the coating that structural integrity of the coating is maintained even upon application of stress to the coating.

In another embodiment of the present invention, the polymer of the coating has an initial Tg of greater than about 70° C. This embodiment may require the additional use of a coalescing agent to assist in uniform formation of a coating. Additionally as described above, these higher Tg films tend to exhibit greater affinity for the substrate if the chemistry of the polymer comprises functionality in common with the substrate.

In one embodiment of the present invention, the polymer to be used in the coating composition is a carboxylic acid functional polymer that is a copolymer prepared from polymerization of one or more unsaturated aliphatic carboxylic acids and esters, with one or more other reactive monomers such as acrylamide, acrylonitrile, vinyl chloride, allyl chloride, vinyl acetate, and ethylenically unsaturated groups such as ethenyl and 2-propenyl. Ter- and higher polymers can also be used. In this copolymer system, the unsaturated aliphatic carboxylic acids of this copolymer are preferably, for example, one or more of acrylic acid, 2-chloroacrylic acid, 3-chloroacrylic acid, 2-bromoacrylic acid, 3-bromoacrylic acid, methacrylic acid, itaconic acid, maleic acid, glutaconic acid, aconitic acid, citraconic acid, mesaconic acid, fumaric acid, tiglic acid and maleic anhydride.

In a preferred embodiment, the polymer of the aqueous coating composition is a vinyl chloride/(meth)acrylate co-polymer emulsion. Most preferably, these polymers comprise at least about 80% of vinyl chloride that is co-polymerized with up to about 20 percent of acrylate or methacrylate functionality. Particularly preferred such polymers include XPD-2111 polymer and TO-81 polymer, both produced by Noveon, Inc. (previously known as BF Goodrich).

In another preferred embodiment, the polymer of the aqueous coating composition is an acrylonitrile/(meth)acrylate co-polymer emulsion. Most preferably, these polymers comprise about 35–50 percent acrylonitrile in the copolymer. Particularly preferred such polymers include Rhoplex 1691 polymer, commercially available from Rohm & Hass. This class of polymer has been found to exhibit excellent chemical and barrier resistance.

In another preferred embodiment, the polymer of the aqueous coating composition is an ethylene/vinyl chloride copolymer system. Most preferably, these polymers comprise about 50–75 percent of vinyl chloride in the copolymer. Particularly preferred such polymers are commercially available from Air Products, Inc. as Airflex® 4500, 4513, 4532 polymers.

In another preferred embodiment of the present invention, the polymer to be used in the aqueous coating composition may be a polycarbonate urethane polymer. These polymers may actually be either aromatic or aliphatic in nature, provided that they have acid functionality such that they are ionomeric the cross-linkable. Particularly preferred such polymers are commercially available as 66–012 polymer from Stahl USA (Boston, Mass.). In a particularly preferred aspect of this invention, the polymer may additionally be provided with a covalent crosslinking system to provide further resiliency of the coating on the substrate. Most preferably, this polymer is further cross-linked with melamine to provide covalent cross-links. Melamine is particularly preferred as a covalent crosslinking agent because it is easily incorporated in aqueous systems and exhibits relatively low toxicity. This coating composition is particularly advantageous, because it has a combination of some covalent crosslinks, in combination with ionomeric crosslinks.

In another preferred embodiment of the present invention, the polymer to be used in the aqueous coating composition may be vinylidene chloride. Particularly preferred such polymers are commercially available as Hycar™ 260912 polymer from Noveon Inc.

The coating compositions of the present invention optionally may comprise a blend of polymers that comprise ionically crosslinkable functionality. Additionally, the coatings of the present invention may further comprise blends of polymers that comprise ionically crosslinkable functionality, together with polymers that do not comprise ionically crosslinkable functionality.

An ionomeric crosslinking counterion is additionally preferably provided in the coating composition that is capable of ionically crosslinking the polymer. Useful ionomeric crosslinking agents include epoxy functionalized ethylene copolymer crosslinking agent, peroxide crosslinking agent, and zinc. Such ionomeric crosslinking agents are further described in, e.g., U.S. Pat. Nos. 5,162,427 and 6,153,680. Preferably this crosslinking counterion is zinc, most preferably provided as a coordination compound of zinc ammonium or zinc ammonium carbonate. Convenient compositions for providing zinc are commercially available as Zinplex 15™, from Ultra Additives Inc. The ionomeric crosslinking counterion is provided in an amount sufficient to provide ionomeric crosslinking to the coating composition so that the coating composition acts to retain VOCs. Preferably, the counterion is present in an amount sufficient to neutralize essentially all of the acid functionalities of the polymer. Most preferably, the counterion is added in excess of the amount required to neutralize all of the acid functionalities of the polymer.

Because the coating composition is applied out of an aqueous composition, the acid functional polymer or polymers comprising precursors to acid functionality may be provided in a single solution together with the ionomeric crosslinking counterion. This composition is stable, because the ionomeric crosslinks do not form until the coating composition is at least partially dried. Conversion of acid precursors to the corresponding acid may optionally be carried out prior to application of the coating composition to the substrate, or alternatively may be carried out during application. The preferred conversion is by hydrolysis of precursors such as ethyl acrylate and butyl acrylate, assisted by heating the coating composition to a temperature effective to undergo hydrolysis of the particular acid precursor.

In the case of polymers that do not by themselves afford sufficient adhesion to the intended substrate, adhesion promoters may optionally additionally be added to the aqueous coating compositions used in the present invention. Such adhesion promoters include solvents that are effective to prepare the surface of the substrate for adhesion by the polymer coating of the surface, such as N-methyl-2-pyrrolidone and ethyl lactate. These adhesion promoters are preferably present an amount greater than about one percent, but less than about eight percent and more preferably from about two to about five percent, so that they themselves do not act as the source of VOCs that could be emitted from the overall article. The need for adhesion promoters in coating compositions of the present invention may be determined by routine empirical evaluation of various coating compositions on the intended substrate. In the event that the adhesion promoter is a low boiling solvent, such adhesive promoter is preferably present in a sufficiently low amount so that the Flash Cup Rating of the overall coating composition is above 212° F.

Additional components may be added to the aqueous coating composition in order to provide desired properties of both the intermediate coating composition and the final product. For example, additives may be provided to enhance coatability, color, modify viscosity, fragrances and the like.

Filler may also be incorporated as desired in the coating composition, provided that such filler does not deleteriously affect the VOC containment properties of the resulting coating. More specifically, the filler may preferably be selected from non-reinforcing fillers such as mineral fillers, glass bubbles and the like, or may be selected from polymeric resins. The filler material is preferably selected from pigments, such as TiO2. Often such pigments are provided in a polymeric resin carrier, which is appropriately included as a part of the filler material mass for measurement purposes.

Coating compositions as described herein may be applied by any appropriate technique, such as a spraying, or casting by various techniques, such as using a doctor blade or other method of application. Preferably, the coating is applied as a continuous and uniform coating. Most preferably, the coating is applied at a rate of at least about 2.4 g/sq. yard dry weight, and more preferably from about 2.4 g to square yard to about 20 g/sq. yard dry weight.

In order to provide a continuous coating with as little introduction of VOCs to the environment as possible, preferably the coating is cured by application of energy such as a hot air stream or radiant energy. Preferred forms of radiant energy comprise heat supplied by heat lights, including lights at visible, UV and infrared wavelengths. In products wherein the coating is applied as part of a continuous web process, the coating applicator is preferably installed in line with the web manufacturing equipment and the heating elements are preferably installed downweb from the coating equipment so that heat is applied shortly after coating. Alternatively, the coating may be applied to a web as a separate application step after complete manufacture of the web.

In one aspect of the present invention, the coating may be applied to a substrate after ventilation of the substrate to remove as much VOC from the substrate as possible prior to application of the coating, which will thereafter cause VOC retention and further limit escape of the VOC from the substrate. Thus, the total amount of VOC that is released by the substrate after coating and placement in the environment of use may be lowered by prior removal of as much VOC as is practicable. In a preferred embodiment of this aspect, VOCs are removed by ventilation of the substrate, for example by exposing the substrate to a stream of air, and particularly to heated air.

The present coating finds particular benefit as a topcoat on a vinyl film, such as used in wallcoverings, furniture coverings and the like. Most preferably, the coating's other present invention are applied to vinyl films that are limited in content of VOCs, such as is described in as described in application Ser. No. 10/262,547 ("Halogen-Containing Vinyl Polymer Compositions," filed 30 Sep. 2002, Sobieski), the entire contents of which are expressly incorporated herein by reference.

The present coating finds particular benefit as a post-printing application, because inks used in printing various materials are major sources of indoor VOCs. Preferably, the coating applicator is placed in line and immediately following the printing apparatus in a printing shop. Most preferably, the coating apparatus is a part of the printing machine, and is applied as an overcoat in the same printing machine. Alternatively, the coating applicator is located in the same print shop as a separate machine. In a particularly preferred embodiment, the coatings of present invention are applied over the top of ink formulations that similarly contain ionomerically cross-linkable functionality, such as described in application Ser. No. 10/262,545 ("Ink Formulations and Methods," filed 30 Sep. 2002, Sobieski), the entire contents of which are expressly incorporated herein by reference. In a particularly preferred embodiment, the coatings of the present invention are applied over the top of ink formulations that contain ionomerically cross-linkable functionality, and additionally comprise zinc in the ink formulations as an ionomeric cross-linking counter ion.

Other substrates that benefit from the coatings of the present invention include plastic materials or substrates comprising plastic as a component thereof. The coatings of the present invention may additionally be applied to other surfaces, such as floorings, vinyl furniture and the like. Particularly preferred substrates include wallcovering materials (e.g., vinyl wallcoverings and wallcoverings made from other plastic materials or comprising plastic as a component), floorings, floorcoverings, ceiling tiles, decorative laminates, varnishes, coatings, printed goods (e.g., posters, books, and magazines), inks, paint coverings, packaging, furniture (e.g., vinyl furniture or wood furniture), materials made from particle board, carpets, equipment, appliances and so forth.

The coatings of the present invention are particularly effective in retaining VOCs within particleboard and/or other materials comprising a resin component that emits VOCs. Particleboard substrates find particular benefit in coating compositions of the present invention, because they are known to emit undesirable substances such as formaldehyde. Any amount of reduction of formaldehyde emission is of substantial benefit.

Additionally, the coatings of the present invention provide particular benefit in retaining VOCs in a surface that has been powder coated. Powder coating is a process of providing a surface with an excellent, often very durable, coating. Preferred such surfaces include coated metal articles such as used to fabricate household appliances and the like.

In a particularly preferred aspect of the present invention, a substrate article may be prepared from a number of component materials, such as particleboard and vinyl film. These individual components of different materials are combined to form a total piece of furniture, such as a couch, chair, table or the like. The coatings of the present invention may be applied to all surfaces of the substrate article, including all materials thereof. This application totally encases the substrate article, thereby retaining the VOCs contained within one or more components of the substrate article. In another preferred aspect of the present invention, the coating may be applied to a substrate that is an article having a first major surface and a second major surface. The coating composition is applied to the first major surface, and provides effective reduction of the emission of VOCs therefrom. This is particularly effective in limiting the total emission of VOC from a substrate when the non-coated surface of the substrate is intended to be adhered or otherwise in contact with another structure, such as a wall or other surface that itself hinders the emission of VOC to the relevant environment.

While in one aspect, the coatings of the present invention are preferably applied in the manufacturing operation, alternatively the coating may be applied on site to control emission of VOCs in an existing structure.

After application of the coating composition to the substrate, stable ionomeric crosslinks are formed. These crosslinks are stable in non-alkali conditions. In a preferred embodiment of the present invention, a VOC retaining coating composition may be provided that is optionally removable from the substrate. Thus, if it is desired to remove the cross-link matrix from the substrate, an alkali composition such as an ammonium-water solution may be applied to the coating, which will disrupt the ionomeric crosslinks.

The containment of VOCs may be evaluated by techniques known in the art for isolating product to be evaluated, air sample collection of the headspace over the product, and chemical analysis to identify the amount of VOC being emitted by the product. Preferably, the coatings of the present invention reduce the amount of VOC emission, when coated on the substrate at a coating weight of at least about 2.4 g/sq. yard, to no more than about 90% of the VOC emissions level of a like substrate without said coating. Most preferably, the substrate emits VOCs at a level less than about 1000 $\mu g/m^{2}*hr$, more preferably 750 $\mu g/m^{2}*hr$, and most preferably 500 $\mu g/m^{2}*hr$.

As a specific evaluation technique, Volatile Ingredient Evaluations are made by loading product to be tested into a controlled environmental chamber. The sample is collected, placed in the environmental chamber, and allowed to equilibrate within the chamber prior to running the Volatile Ingredient Evaluation.

Samples are tested in environmental chambers designed to measure emissions from the sample. The size of the environmental chamber is chosen to allow testing at the same loading ratio of exposed surface area to room volume as found in a typical indoor environment, so that the results of the chamber testing are scalable to any size room. Typically, the environmental chambers are provided in a size in the range of approximately 0.5 $m^3$ to approximately 26 $m^3$ (which would simulate room size). When the test samples are provided as one square meter (1 $m^2$) of vinyl halide polymer film, the test chamber is preferably one cubic meter (1 $m^3$) in size. Test chambers are manufactured by Air Quality Sciences, Inc. (Atlanta, Ga.).

Likewise, the interior of the environmental chamber is designed to provide an inert environment so that background emissions levels are kept as low as possible. The walls and doors of the environmental chamber are constructed of polished stainless steel with inert seals. The test chamber is designed to meet construction specifications and performance requirements established by the U.S. EPA guidelines and ASTM Standard D5116-97, "Standard Guide for Small Scale Chamber Determination of Organic Emissions from Indoor Materials/Products," and ASTM Standard D 6670-01, "Standard Practice for Full-Scale Chamber Determination of VOCs from Indoor Materials/Products." Prior to loading sample into the environmental chamber, background levels can be determined to establish a baseline for testing.

Optionally, sample can be permitted to equilibrate with the environmental conditions in the chamber prior to commencement of the testing period. When performed, this equilibration period generally comprises four to twenty-four hours. In a preferred scenario, an equilibration period is not included in the testing protocol.

During testing, purified air at standard environmental conditions of 23° C. (73.4° F.) and 50% relative humidity is cycled through the environmental test chamber, and these standard conditions are maintained throughout the testing period. The environmental chamber includes inlet air and exhaust air manifold systems that are configured to assure that the air inside the chamber is well mixed, so that an air sample from the center of the chamber contains the same concentration of pollutants (from a product inside the chamber) as an air sample from one of the back corners of the chamber. Environmental conditions of the inlet air and the chamber air can be monitored throughout the test to assure that the test conditions are met and the chamber operates in a stable manner.

Sampled air from the environmental chamber is collected on a solid sorbent and thermally desorbed into a gas chromatograph with mass spectrometric detection (GC/MS). The solid sorbent collection media contains both Carbosieve SIII and Tenax TA. The following instrumentation is used to analyze results: NuTech 8533 Universal Sample Concentrator with a HP 5890 Series II Gas Chromatograph and HP 5971 Series Mass Selective Detector (MSD) or a Perkin-Elmer ATD-400 Thermal Desorbtion System with a HP 6890 GC and HP 5973 MSD.

After collection, the chemicals adsorbed on the sorbent media are thermally desorbed into the capillary GC/MS. Individual VOCs are separated and detected by the GC/MS. Individual VOCs can be quantified (relative to a suitable standard such as phenol, hexanoic acid, 1-dodecene, toluene, or other VOCs suspected to be emitted from the product) and identified by comparison to known mass spectral data. Mass spectral databases are maintained by Air Quality Sciences, Inc. (AQS, Atlanta, Ga.) and by the Environmental Protection Agency and National Institutes of Health. TVOC measurements are made by adding all individual VOC responses obtained by the mass spectrometer and calibrating the total mass relative to toluene.

The multi-bed collection technique, separation, and detection analysis methodology are described, for example, in Bertoni, G., Bruner, F., Liberti, A. and Perrino, C. "Some Critical Parameters in Collection, Recover, and Gas Chromatographic Analysis of Organic Pollutants in Ambient Air Using Light Adsorbents." J. Chromatogr., 203, 263–270 (1981); Bertoni, G., Bruner, F. and Crescentini, G. "Critical Evaluation of Sampling and Gas Chromatographic Analysis of Halocarbons and other Organic Air Pollutants." J. Chromatogr., 167, 399–407 (1978); Mangani, F., Marras, O. and Mastrogiacomo, A. "Evaluation of the Working Conditions of Light Adsorbents and their Use as Sampling Material for the GC Analysis of Organic Air Pollutants in Work Areas." Chromatographia, 15, 712–716 (1982); Murphy, N. T., Riggan, R. M. and Winberry, W. T. Environmental Protection Agency. *Compendium of Methods for the Determination of Toxic Organic Compounds in Ambient Air* (EPA Rpt, 600/4-89/017). Washington, D.C.: Environmental Protection Agency (1988), (the disclosures of which are incorporated herein by reference).

The Volatile Ingredient Evaluation follows EPA Method 1P-1B and is generally applicable to $C_4$–$C_{16}$ organic chemicals with boiling points ranging from 35° C. to 250° C. The evaluation has a detection limit of 0.5 $\mu g/m^3$ for most IVOCs and TVOCs.

Results of Volatile Ingredient Evaluation

VOC emissions are measured over a testing period, typically over 96 hours. The Volatile Ingredient Evaluation provides three measurements: emission factors, emission rates, and predicted air concentrations. A Volatile Organic Compound Emission Factor is the amount of a chemical that is emitted at a particular point in time. The Emission Factor is measured for a certain exposed area of the product, for example, a square meter of a film such as a chloride-containing vinyl polymer film. For example, a chloride-containing vinyl polymer film can emit 50 $\mu g/m^2$*hr of phenol. This means that every square meter of the vinyl chloride polymer film will emit 50 micrograms of phenol per hour of exposure time. This assumes the product is constantly emitting phenol. If the product is not constantly emitting phenol, but emissions are decreasing over time, the Emission Factor is a qualitative estimate of emissions release at a particular point in time.

An emission rate mathematically describes how a product's emissions change over time. This emission rate requires an environmental chamber test with multiple sampling episodes, over an extended time period (typically, six samples over the 96-hour test period). Several factors can affect the emission rate of a product, including temperature, humidity, air exchange rate, ambient pollutant concentrations, and air velocity. For most interior products, emission rates are either constant (product emissions remain the same over a test period) or they are decreasing (product emissions actually decline over a test period). The emission rate is commonly displayed as a mathematical equation using two characteristic parameters: the initial emission factor and the decay rate. These two parameters define the emission rate profile. The test period is 96 hours with periodic measurement points, for example, at 4, 8, 24, 48, 72 and 96 hours. The Emission Factor describes a product's emissions at one point in time assuming constant emissions. If a product has been shown to be a constant emitter, the Emission Factor and emission rate will be the same. If the product's emissions change over time, it will have a different Emission Factor at every point in time.

The predicted air concentration describes the amount of chemicals or particles contained in a unitized volume of air. When the air in a dynamic chamber is sampled, the mass collected is what is actually measured. The air concentration (expressed in $\mu g/m^3$) is then derived as the collected mass of the contaminant (in micrograms) divided by the amount of air sampled (cubic meters). The measured air concentration is representative of what a building's occupants would breathe.

To determine a product's predicted air concentration, the product's emission rate must be determined, since the more a product emits pollutants, the greater the exposure concentration of pollutants in a room. The environment in which the product will be used must then be defined. The use environment is described in terms of building air flows, percentage of outside air, room size, amount of product in the space, and possible additional emission sources. These parameters are used in a computer program that mathematically models the actual air flow and emissions and calculates the predicted air concentration.

TVOC standards for air concentrations for wallcoverings have been developed by the State of Washington (0.5 $mg/m^3$ at ambient conditions, including 23° C., 50% relative humidity) and the U.S. Environmental Protection Agency (0.05 $mg/m^3$, at ambient temperatures, including 23° C., 50% relative humidity).

The invention will further be illustrated by the following non-limiting examples.

EXAMPLE 1

An ink composition and a coating composition was prepared by mixing the following ingredients:

| Reagent | parts |
| --- | --- |
| Ink composition | |
| XPD-2111 resin from Noveon | 26.15 |
| fumed silica (TS100 from Degussa) | 3.85 |
| Urethane thckener (PrintRite from Noveon) | 5 |
| Defoamer | 0.3 |
| Isopropyl alcohol | 5 |
| N-Methyl-2-pyrrolidone | 3 |
| Water | 54.7 |
| Red pigment | 2 |
| surfactant if necessary for wetability | ≦5% |
| Coating composition | |
| XPD-2111 resin from Noveon | 26.15 |
| fumed silica (TS100 from Degussa) | 3.85 |
| Urethane thickener (PrintRite from Noveon) | 5 |
| Defoamer | 0.3 |
| Isopropyl alcohol | 5 |
| N-Methyl-2-pyrrolidone | 3 |
| Water | 54.7 |
| Red pigment | 2 |
| surfactant if necessary for wetability | ≦5% |

A vinyl substrate was provided, which was a 13.3 oz/yd² polyvinyl chloride sheet laminated to a woven polyester/cotton backing. Three samples of this substrate were printed with identical ink vehicles and patterns as follows:

Sample A was printed with a gravure print cylinder that applied 3 lbs/100 linear yards ink at a total solids of 27%. Sample B was printed with the same ink lay down as A, with a coating composition applied as a top finish. Sample C was prepared with the same ink and coating composition as described in B above, with the addition of zinc ammonium solution to the wet printed coating composition, (Zinplex 15 from Ultra Additives) at a coating rate of 2% of zinc solution based on the amount of wet coating composition solution on the substrate.

The following Total VOC emission as determined by the Volatile Ingredient Evaluation at the 96$^{th}$ hour was observed.

| Sample ID | Comparative Example A | Comparative Example B | Example C |
|---|---|---|---|
| TVOC $\mu$ grams/m$^2$/hr | 457 | 532 | 432 |

This experiment demonstrates that the addition of ionomeric crosslinks to a polymeric coating composition significantly reduces the amount of VOC emissions of a polymer film.

All patents, patent documents, and publications cited herein are incorporated by reference as if individually incorporated. Unless otherwise indicated, all parts and percentages are by weight. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of formulating a coating for containment of VOCs in a substrate comprising VOCs, comprising
   a) identifying a substrate material;
   b) determining which VOCs are present in the substrate in an amount to generate undesirable emissions,
   c) using the information determined in step b) to formulate a coating composition that is sufficiently incompatible with the VOC to be contained as to pass a VOC Incompatibility Test.

2. The method of claim 1, wherein the substrate is a resin-containing component.

3. The method of claim 1, wherein the substrate comprises plastic.

4. The method of claim 1, wherein the substrate is a vinyl film.

5. The method of claim 1, wherein the substrate comprises pressboard.

6. A method of formulating a coating for containment of VOCs in a substrate comprising VOCs, comprising
   a) identifying a substrate material;
   b) determining which VOCs are present in the substrate in an amount to generate undesirable emissions,
   c. using the information determined in step b) to formulate a coating composition that, when coated on the substrate at a coating weight of at least about 2.4 g/sq. yard, emits no more than about 90% of the VOC emissions level of a like substrate without said coating.

7. The method of claim 6, wherein the substrate is a chloride-containing vinyl polymer film.

8. The method of claim 6, wherein the substrate comprises a polyvinyl chloride film.

9. The method of claim 6, wherein the substrate is an article comprising a plurality of materials and a plurality of surfaces, and the coating compositions are applied to all surfaces of the substrate.

10. The method of claim 6, wherein the substrate is an article having a first major surface and a second major surface, wherein the coating composition is applied to the first major surface.

11. The method of claim 6, wherein the coating composition, when coated on the substrate at a coating weight of between about 2.4 g./sq. yard to about 20 g./sq. yard, emits no more than about 90% of the VOC emissions level of a like substrate without said coating.

12. The method of claim 6, wherein the coating composition, when coated on the substrate at a coating weight of between about 20 g./sq. yard and about 40 g./sq. yard, emits no more than about 90% of the VOC emissions level of a like substrate without said coating.

13. The method of claim 6, wherein the substrate is a resin-containing component.

14. The method of claim 6, wherein the substrate comprises plastic.

15. The method of claim 6, wherein the substrate is a vinyl film.

16. The method of claim 6, wherein the substrate comprises pressboard.

17. The method of claim 6, wherein the substrate comprises a powder coated surface.

18. The method of claim 6, wherein the coating composition is an aqueous coating composition comprising
   i) an ionomerically crosslinkable polymer; and
   ii) water.

19. The method of claim 6, wherein the coating composition comprises
   i. a polymer having a plurality of ionic functionalities;
   ii. an ionomeric crosslinking counterion capable of crosslinking said polymer, and
   iii. water.

20. The method of claim 19, wherein the polymer has acid or acid precursor groups, and said polymer has an acid number of at least about 3.

21. The method of claim 20, wherein the polymer is a vinyl chloride/(meth)acrylate co-polymer emulsion.

22. The method of claim 20, wherein the polymer is an acrylonitrile/(meth)acrylate co-polymer emulsion.

23. The method of claim 20, wherein the polymer is ethylene/vinyl chloride copolymer.

24. The method of claim 20, wherein the polymer is a polycarbonate urethane polymer.

25. The method of claim 24 wherein the polymer is crosslinked with melamine.

26. The method of claim 20, wherein the polymer is vinylidene chloride.

27. The method of claim 20, wherein the polymer is a carboxylic acid functional polymer prepared from polymerization of one or more unsaturated aliphatic carboxylic acids with one or more reactive monomers selected from the group consisting of acrylamide, acrylonitrile, vinyl chloride, allyl chloride, vinyl acetate, and ethylenically unsaturated groups.

28. The method of claim 19, wherein the coating composition comprises a blend of polymers that comprise ionically crosslinkable functionality.

29. The method of claim 19, wherein the coating composition comprises blends of polymers that comprise ionically crosslinkable functionality, together with polymers that do not comprise ionically crosslinkable functionality.

30. The method of claim 19, wherein the ionomeric crosslinking counterion is zinc.

* * * * *